United States Patent
Quesada

(10) Patent No.: US 6,457,718 B1
(45) Date of Patent: Oct. 1, 2002

(54) METHOD OF FORMING A PIPE JOINT BETWEEN METAL PIPES USING AN EXTENSIBLE GASKET

(75) Inventor: Guido Quesada, San Jose (CR)

(73) Assignee: S & B Technical Products, Inc., Forth Worth, TX (US)

(*) Notice: Subject to any disclaimer, the term of this patent is extended or adjusted under 35 U.S.C. 154(b) by 0 days.

(21) Appl. No.: 09/648,907

(22) Filed: Aug. 25, 2000

(51) Int. Cl.[7] .................. F16L 21/02; F16L 21/025; F16L 21/00
(52) U.S. Cl. .................. 277/314; 277/604; 277/608; 277/609; 277/616; 285/231; 285/378
(58) Field of Search .................. 277/314, 602, 277/603, 604, 607, 608, 609, 612, 615, 616; 285/379, 374, 378, 230, 231

(56) References Cited

U.S. PATENT DOCUMENTS

| | | | | |
|---|---|---|---|---|
| 1,985,325 A | * 12/1934 | Nathan | ......................... | 277/625 |
| 2,130,039 A | * 9/1938 | Shkolnick | ................. | 285/287.1 |
| 2,501,943 A | * 3/1950 | Jack | ............................ | 277/615 |
| 2,615,741 A | * 10/1952 | Nathan | ......................... | 277/605 |
| 4,223,895 A | * 9/1980 | Roberts et al. | ............. | 277/625 |
| 4,229,026 A | * 10/1980 | Seiler | ........................... | 285/105 |
| 4,458,904 A | 7/1984 | Delhaes | ....................... | 277/207 |
| 4,510,664 A | * 4/1985 | Lock | ............................ | 156/218 |
| 5,295,697 A | * 3/1994 | Weber et al. | ................ | 277/616 |
| 5,417,442 A | * 5/1995 | Jornhagen | .................... | 277/615 |
| 5,464,228 A | * 11/1995 | Weber et al. | ................ | 277/615 |
| 5,649,713 A | * 7/1997 | Legerwood | .................. | 277/615 |
| 5,779,286 A | 7/1998 | Kaishio | ....................... | 285/379 |
| 6,168,208 B1 | * 1/2001 | Thaler | ......................... | 277/607 |
| 6,220,605 B1 | * 4/2001 | Becker, Jr. | .................... | 277/591 |

* cited by examiner

Primary Examiner—Anthony Knight
Assistant Examiner—Vishal Patel
(74) Attorney, Agent, or Firm—Bracewell & Patterson, LLP

(57) ABSTRACT

A pipe gasket and a method of forming a pipe joint between a metal spigot pipe and metal belled pipe. The gasket has three regions to facilitate a seal. A seal region forms the primary seal within the groove of the belled pipe. A sleeve region extending from the seal region forms a sleeve around the end of an inserted spigot pipe to protect the pipe from contact with fluids flowing there through. A retainer region coupled to the sleeve region covers the end of the spigot pipe and also acts as a stop to prevent over-insertion of the spigot pipe into the belled pipe. The three regions cooperate to form a sleeve around the spigot pipe end and to prevent over-insertion of the spigot pipe into the belled pipe.

6 Claims, 2 Drawing Sheets

METHOD OF FORMING A PIPE JOINT BETWEEN METAL PIPES USING AN EXTENSIBLE GASKET

BACKGROUND OF THE INVENTION

1. Field of the Invention

The present invention relates in general to a method of forming a fluid tight pipe joint and the gasket for forming the joint. Specifically, the invention relates to a method of forming a pipe joint, and a gasket used to form the pipe joint between a metal spigot pipe and a metal belled pipe, the gasket being extensible from a resting state to an engaged state once the spigot pipe is inserted into the gasket fitted within the bell pipe.

2. Description of the Prior Art

Pipe joints are typically formed between a belled (female) pipe end and a spigot (male) pipe. The belled pipe may have a complex interior surface such as bevels and grooves, which is especially typical in polymer or plastic pipes. Typically, an elastomeric gasket will fit within the circumferential groove of the belled pipe to facilitate the formation of a pipe joint with the spigot pipe. The gasket forms a tight seal between the inside surface of the bell pipe and the outside surface of the spigot pipe inserted therein.

Metal pipes may also be made to have belled ends and gaskets therein. While metal pipes are inherently stronger than most plastic pipes, there are several problems associated with using metal pipes. Metal pipes used as conduits for fluid transport often must be cut or chamfered on the job site in order to facilitate the formation of pipe joints. If the pipe is a corrodible metal such as steel, cutting the metal can lead to rusting, pitting, and other corrosion that will ultimately breach the integrity of the seal between the two pipes. While coating the pipe ends with a paint or other polymer can prevent contact between the fluids and the exposed metal surface, this is often not possible or practical at a job site.

Gaskets are often used in forming pipe joints between metal pipes. However, most gaskets simply fit within the groove of the bell pipe, allowing the spigot pipe and the end of the pipe to be mostly exposed once inserted into the belled pipe having the gasket therein. Thus, the elastomeric gasket may only contact a limited circumferential region of spigot pipe outside surface and leave most of the surface exposed to the fluids that flow there through. The region of contact with the spigot pipe in most gaskets is limited to the size of the seal region that is opposite the region of the gasket that contacts the groove. The area of contact is extended somewhat in gaskets having a flange extending from the seal region. However, this flange in most gaskets serves the purpose of forming an area of pressured contact with the gasket to effectuate a ringed seal around the outside surface of the spigot pipe. This arrangement still leaves potentially cut or chamfered portions of the spigot pipe exposed.

What is needed is a pipe gasket and method of forming a pipe joint that will be advantageous to use with metal pipes that must be cut or shaved in some way at a job site.

SUMMARY OF THE INVENTION

Thus, it is one object of the present invention to provide a simpler method of preventing corrosion in metal pipes that are cut or shaved at a job site.

It is another object of the present invention to provide an elastomeric gasket with an extensible sleeve region to form a sleeve around the end of a spigot end of a spigot pipe, thus preventing contact with water.

It is yet another object of the present invention to provide a gasket that will engage the inserted spigot pipe and stop further movement at the proper stage of insertion to thus facilitate the formation of a sealing interface between the gasket and spigot pipe.

These and other objects are achieved by providing a pipe gasket and a method of forming a pipe joint between a spigot pipe having an outside surface and a spigot end, and a belled pipe having an annular groove and terminal face. The method is preferably practiced by providing metal spigot and belled pipes. The method comprises first providing an elastomeric gasket having a seal region and a retainer region joined by a sleeve region there between. The gasket is inserted into the annular groove of the belled gasket such that the seal region abuts the annular groove and the retainer region protrudes away from the terminal face.

The spigot pipe end is then inserted into the belled pipe end having the gasket located therein until the spigot end sealingly engages the retainer region thus preventing further movement of the spigot pipe, the sleeve and retainer regions thereby forming a fluid tight interface against the spigot pipe to prevent contact between fluids flowing through the pipes and the spigot pipe end and outer surface.

There are other specific features of the gasket of the invention that effectuate its function. The sleeve region is extensible, thus allowing the formation of an elastomeric sleeve around the spigot pipe outside surface and spigot end. Typically, the retainer region has a retainer ring therein for forming a fluid tight seal at the spigot pipe end. The retainer ring has a diameter slightly less than the inside diameter of the spigot pipe inside diameter, the ring thus forming a lip around the inserted spigot pipe end. The ring is typically a rigid, metal ring. Finally, the gasket may further have a compression gap in the seal region, the compression gap allowing the seal region to deform and place pressure upon the annular groove of the belled pipe and the outside surface of the spigot pipe.

Additional objects, features and advantages will be apparent in the written description which follows.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
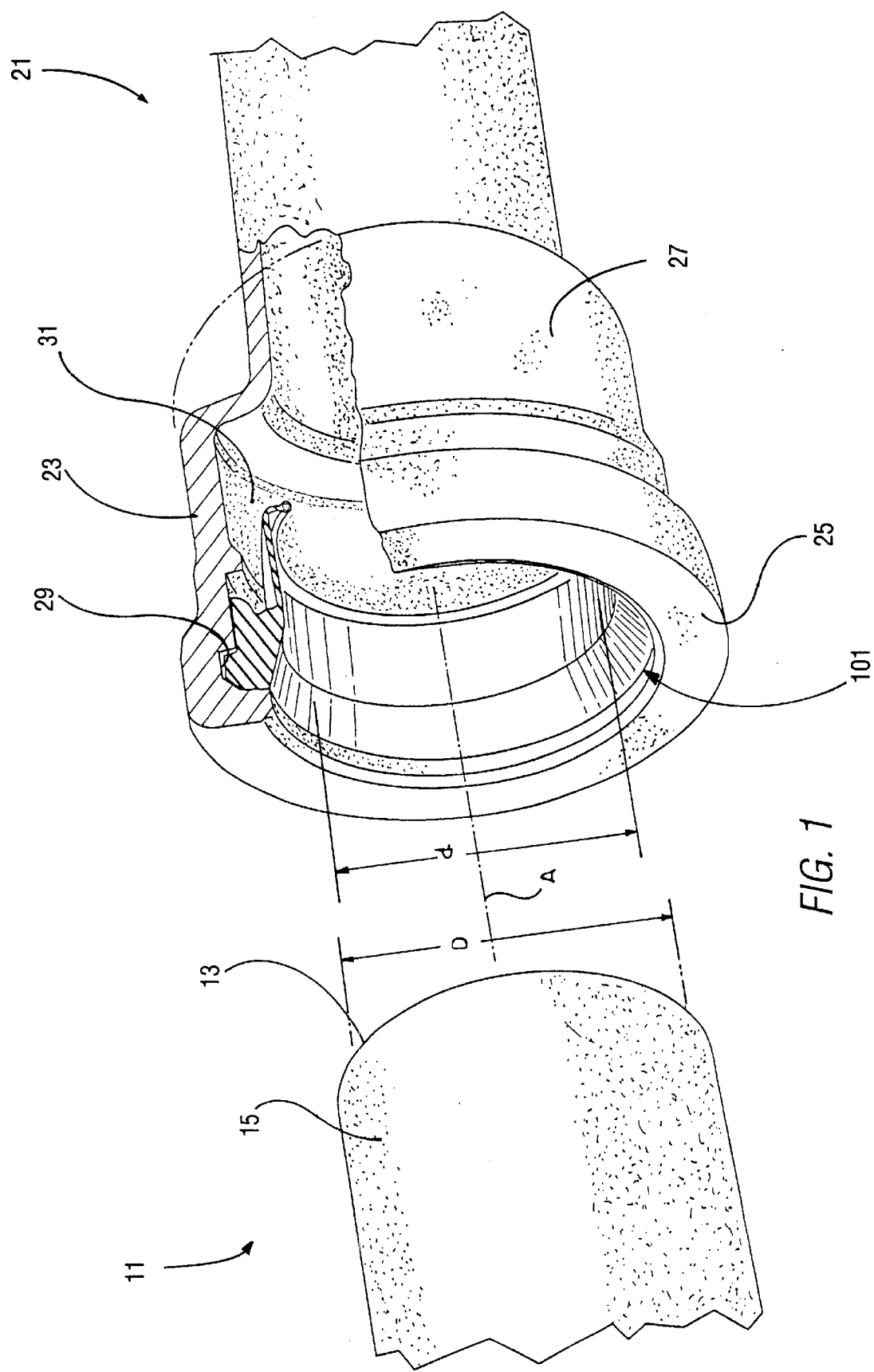
FIG. 1 is a perspective view of the pipe gasket of the invention seated within a bell end of a bell pipe, the bell pipe and spigot pipe to be inserted therein having a similar axis.

The present invention is a method of forming a fluid tight pipe joint between two metal pipes, and the gasket for effectuating a seal between the pipes. The invention is directed towards protecting the cut and/or chamfered end of a metal spigot (male) pipe to be inserted into a belled (female) pipe to form a pipe joint. The gasket for forming a seal is elastomeric in nature and is made from any suitable natural or synthetic polymer material that is durable and capable of being flexed. The overall durometer (hardness) of the gasket can vary, depending upon the desired usage, and the durometer of the various parts of the gasket can also vary. The pipe joint created by the present invention is a joint between a belled pipe having a bell end and an annular groove, and a spigot pipe having a spigot end and an outer surface. While the gasket of the invention is directed towards joints formed from metal pipes, the gasket can also be used for plastic or polymer formed pipes known in the prior art.

The gasket of the invention is an annular member having a seal region coupled to a retainer region with a sleeve region there between, the seal region forming a fluid tight seal within the annular groove of the belled pipe. The gasket is first placed within the groove of the belled pipe in such a way that the seal region fits within the circumferential groove. The geometry of the seal region can vary, depending on the desired usage of the gasket and the pipe joint to be formed. It is preferable that the portions of the seal region that contact the groove surface are beveled such that the insertion force of the spigot pipe within the bell pipe does not displace the gasket.

The sleeve region and retainer region have seal interfaces for forming a fluid tight seal against the outside surface of the spigot pipe once it is inserted. Further, the sealing contact between the interfaces and the spigot pipe are enhanced by the extensible nature of the sleeve region, whereby pressure exerted on the retainer region by the spigot pipe end extends the sleeve region, stretching it out over the end of the spigot pipe as it is inserted, thereby forming a sleeve around the spigot end and outer surface. This interaction between the gasket and the spigot pipe help to prevent fluid contact between the fluids flowing through the pipe joint thus formed and the spigot pipe end.

To further facilitate the formation of the fluid tight seal, the retainer region may also have a retainer ring therein for forming a fluid tight seal at the spigot pipe end. Typically, the retainer ring has a diameter slightly less than the inside diameter of the spigot pipe inside diameter, the ring thus forming a lip around the inserted spigot pipe end once inserted. This lip creates a point of contact pressure concentration that keeps the water or other fluids from entering the interface between the sleeve and the spigot. Preferably, the ring is a rigid, metal ring encased within the elastomeric material of the gasket and forming a part of the gasket.

The seal region of the gasket may further comprise a compression gap, the compression gap allowing the seal region to deform and place pressure upon the annular groove of the belled pipe and the outside surface of the spigot pipe. Also, the seal region may be of various geometries, depending upon the type of belled pipe used and the desired seal strength, etc. A simple geometry may be desirable for low cost, low pressure joints, while a more complex geometry may be desirable for high pressure joints and for joints where deflection is a potential problem.

The pipe joint is formed by inserting the spigot pipe end into the belled pipe end having the gasket located therein until the spigot end sealingly engages the retainer region, precluding further movement of the spigot pipe. Upon such action, the sleeve and retainer regions form a sleeve around the outside surface of the spigot pipe and its spigot end, preventing contact between fluids flowing through the pipes and the spigot pipe end and outer surface. The retainer region also precludes over-insertion of the spigot pipe by acting as a stop for the spigot pipe within the belled pipe. This sleeve can be varied in length depending on the initial length of the unextended sleeve region and coupled retainer region.

The invention is described in greater detail with reference to the Figures, and in particular starting with FIG. 1, wherein the gasket of the invention is shown within a bell (female) pipe end. A spigot (male) pipe 11 is shown having a spigot end 13 and an outside surface 15. Typically, the gasket of the invention is used in conjunction with metal pipes, and the outside surface 15 is thus smooth and metallic. Due to the thickness of the metal pipe, the spigot pipe 11 will have an inside diameter D which is smaller than its outside diameter. The metal spigot pipe 11 is ultimately inserted into the belled pipe having the gasket therein to form a fluid tight joint.

An embodiment of a bell pipe is shown with reference to FIG. 1, bell pipe 21 having a bell end 23 and terminal face 25. The bell pipe 21 also has an outside surface 27 and an inside surface 31. Located within the inside surface is a circumferential groove 29 having a general geometry that mates with the gasket 101 that fits therein. The gasket 101 is one embodiment of the gasket of the present invention and the drawing in the figures is not meant to be limiting.

Figure 2A:
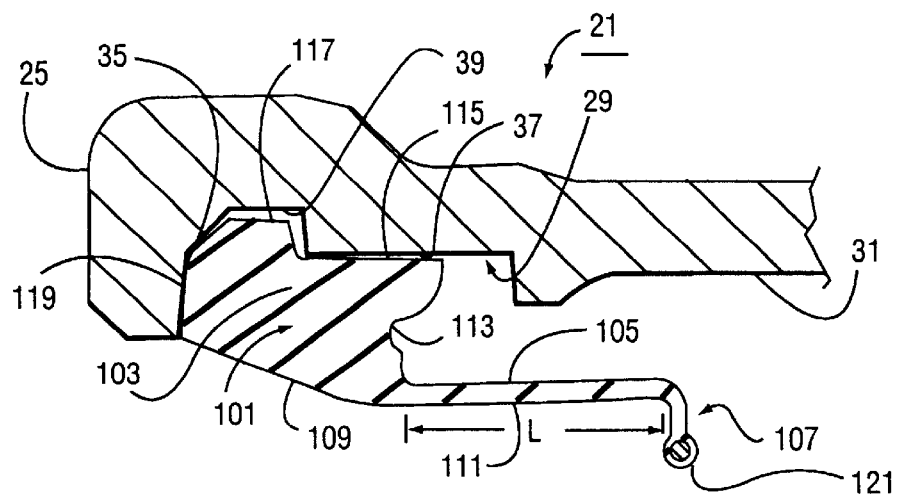
FIG. 2A is a cross-sectional view of the gasket of the invention seated within the groove of the bell pipe, the gasket in its resting state.
Figure 2B:
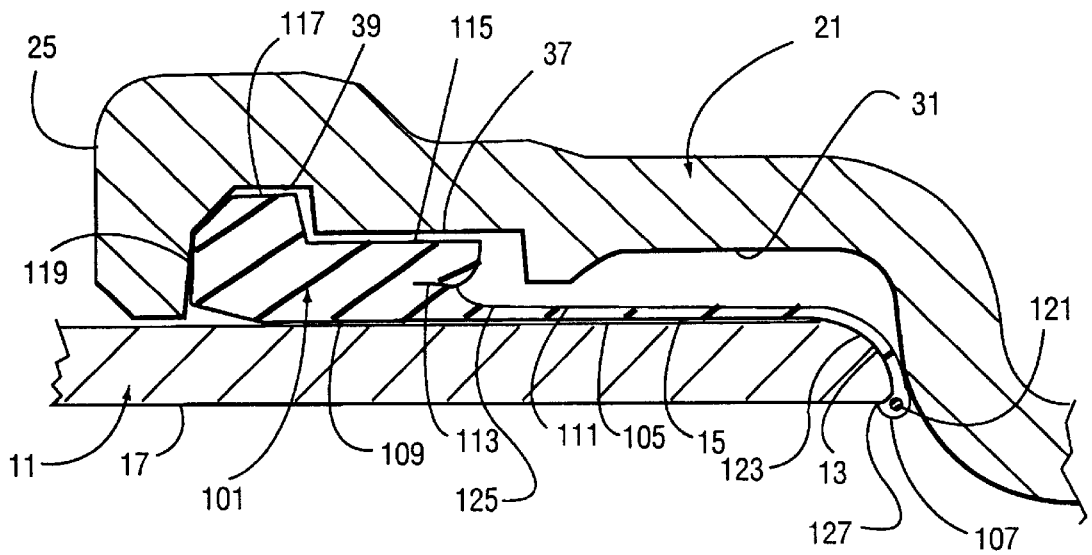
FIG. 2B is a cross-sectional view of the gasket of the invention seated within the groove of the bell pipe, the gasket in its engaged state, the spigot pipe inserted therein.

The gasket 101 has three integral regions which serve the functions of (a) sealing the gasket within the bell pipe groove 29, (b) forming a fluid tight interface at and around the outer surface 15 and end 13 of the spigot pipe, and (c) serving as a stop for preventing over-insertion of the spigot pipe 11. These integral regions are described with reference to FIG. 2A, wherein the resting state of the gasket is shown. The engaged state of the gasket 101 is shown in FIG. 2B. Referring back to FIG. 2A, the gasket 101 comprises three principal regions that effectuate the above stated functions: the seal region 103, the sleeve region 105, and the retainer region 107. These regions act cooperatively to form a fluid tight pipe joint.

The seal region 103 further comprises a spigot ramp 109 to allow easy insertion of the spigot pipe into the gasket fitted within the bell pipe. The spigot pipe end 13 will make contact with the ramp 109, deforming the seal region 103 against the groove 29. The deformation is allowed by compression gap 113, which allows the seal region 103 to deform cooperatively against the bell groove 29 and the spigot outside surface 15. The deformation of the seal region 103 forces the first groove seal 115 and the second groove seal 117 against the first groove face 37 and the second groove face 39, respectively. This stepped feature in the gasket 101, forming a mating zone with the groove 29, secures the gasket within the groove as force is applied against the ramp 109 by the spigot pipe, preventing the gasket from slipping from the groove during the insertion of the spigot pipe.

Extending from the seal region 103 is the sleeve region 105 having a length L, the sleeve region being made of such a thickness as to allow it to be extensible. Coupled to the sleeve region is the retainer region 107, the retainer region making sealing contact with the end 13 of the spigot pipe 11 once inserted. The retainer region has a retaining ring 121 that can be made from a rigid metal. Preferably, the ring 121 is of diameter d (see FIG. 1), which is less than the inside diameter D of the spigot pipe. This allows the ring 121 and retainer region 107 to form a tight seal around the end and outside surface of the spigot pipe once it is inserted into the bell pipe.

The extensible nature of the sleeve region is shown with respect to FIG. 2B, wherein the spigot pipe end 13 contacts the retainer region 107 and deforms or extends the sleeve region away from the terminal end 25 of the bell pipe 21. The sleeve region 105 has a spigot sealing face 111 that makes sealing contact with the outside surface of the spigot 11. In cooperation with the spigot ramp 109, the spigot sealing face 111 and the retainer region form a retainer seal interface 123 and a sleeve seal interface 125, thus keeping fluids flowing within the pipe from contacting the surface of the metal pipe. Typically, a lip is formed from the retainer ring that extends from the edge 127 of the spigot end 13.

The method of forming a pipe joint is shown with reference to the figures. As shown with reference to FIG. 1, the spigot pipe 11 and bell pipe 21 have a central axis A around which both pipes are aligned to facilitate the formation of the pipe joint. The gasket 101 is first inserted into the belled pipe end 23 and into the circumferential groove 29. FIG. 2A shows the gasket 101 seated within the groove 29 in cross-section. The sleeve region 105 and retainer region 107 extend into the pipe away from the terminal face 25 of the bell pipe, wherein the two regions have interfaces 123 and 125 that form a fluid tight seal against the inserted spigot pipe 11.

The spigot pipe 11 is inserted along axis A until it seats against the retainer region 107, as shown in FIG. 2B. The ramp 109 guides the spigot end 13 into place within the bell pipe 21, and as pressure from the outside surface 15 of the spigot pipe is applied on the gasket, the ramp deforms to form a continuous interface with the spigot sealing face 111. The sleeve region 105 is extensible as shown in FIG. 2B, wherein force from end 13 pushes against the retainer region 107 and extends it. The sleeve region and retainer regions are thus pulled tight around the end of the spigot pipe to cover any cut or shaved regions and thus prevent access by water or other fluids that can cause corrosion. The ring 121 forms a lip 127 to help stop further movement of the spigot pipe into the bell pipe and to facilitate formation of a fluid tight seal. In this manner, the fluid tight pipe joint of the invention is formed between the spigot pipe and bell pipe.

The sleeve formed about the end of the inserted spigot pipe 11 can be varied. The overall surface area covered by the sleeve upon the outside surface and end of the spigot pipe can be adjusted by adjusting the initial length L of the sleeve region 105. Also, the durometer of the sleeve region can be adjusted along with its length to adjust the size of the resulting sleeve. A longer initial length L will result typically in a longer sleeve, and hence, a greater interface region between the gasket and pipe inserted therein. Also, adjusting the durometer will adjust the extensibility of the sleeve region, where a typically high durometer will decrease the size of the resulting sleeve, and a low durometer will increase the size of the sleeve.

The present invention offers several advantages. The inclusion of the gasket within a pipe joint eliminates the necessity to paint or coat the outside of the metal spigot pipe and its tip. This is important with metal pipes, e.g., steel pipes, where the pipe is often cut and/or chamfered on site for installation of the pipe. Protecting the cut or shaved region is important for prolonging the life of the pipe since it will then be exposed to liquids passing though the pipe.

Another advantage to the present invention is that the retainer ring creates a point of contact pressure concentration that keeps the water from entering the interface between the sleeve and the spigot. Further, the retainer ring and sleeve region concept can be applied to various seal region designs such as compression seals, lip seals, or V-seals. The ring and the retainer region also prevent over-insertion of the spigot pipe into the belled pipe.

While the invention has been shown in only one of its forms, it is not thus limited but is susceptible to various changes and modifications without departing from the spirit thereof.

What is claimed is:

1. A method of forming a pipe joint between a metal spigot pipe having an outside surface and a spigot end, and a metal belled pipe end having an annular groove located therein intermediate a pipe interior bore and an outer extent of the belled end, the method comprising:

providing an elastomeric gasket having a compression seal region and a retainer region joined by means of an extensible sleeve region therebetween, the retainer region including a rigid, circumferential retainer ring therein for forming a fluid tight seal at the spigot pipe end;

inserting the gasket into the annular groove of the belled pipe end such that the seal region abuts the annular groove and the retainer region protrudes away from the outer extent of the belled end in the direction of the pipe interior bore, the gasket being received entirely within the belled pipe end without extending beyond the outer extent thereof;

inserting the spigot pipe end into the belled pipe end having the gasket located therein until the spigot end sealingly engages the retainer region, the sleeve and retainer regions being extended by movement of the spigot pipe end within the belled pipe end, whereby the retainer ring forms a lip around the inserted spigot pipe end, thereby forming a fluid tight interface against the spigot pipe to prevent contact between fluids flowing through the pipes and the spigot pipe end and outer surface.

2. The method of claim 1, wherein the spigot pipe further has an inside diameter, and wherein the retainer ring has a diameter slightly less than the inside diameter of the spigot pipe, the ring thus forming a lip around the inserted spigot pipe end.

3. The method of claim 1, wherein the ring is a rigid, metal ring.

4. The method of claim 1, wherein the gasket further comprises a compression gap in the seal region, the compression gap allowing the seal region to deform and place pressure upon annular groove of the belled pipe end and the outside surface of the spigot pipe.

5. An elastomeric gasket for forming a seal between a metal belled pipe end having an annular groove located therein intermediate a pipe interior bore and an outer extent of the belled end and a metal spigot pipe having a spigot end with an outer surface, the gasket comprising:

an annular member having a compression seal region coupled to a retainer region by means of an extensible sleeve region located there between, the seal region of the annular member forming a fluid tight seal within the annular groove located within the belled pipe end with the annular member received entirely within the belled pipe end without extending beyond the outer extent thereof;

wherein the retainer region has a rigid, circumferential retainer ring therein for forming a fluid tight seal at the spigot pipe end and wherein the sleeve region and retainer region have seal interfaces for forming a fluid tight seal against the outside surface of the spigot pipe; and the spigot pipe further having an inside diameter, and wherein the retainer ring has a diameter slightly less than the inside diameter of the spigot pipe, the retainer ring thus forming a lip around an inserted spigot pipe end upon insertion of the spigot pipe within the pipe belled end, and wherein the extensible sleeve region in cooperation with the retainer region forms a fluid tight interface over the outer surface of the spigot pipe end, thus preventing contact between fluid flowing through the pipe interior bore and the outer surface of the spigot pipe end.

6. The gasket of claim 5, wherein the gasket further comprises a compression gap in the seal region, the compression gap allowing the seal region to deform and place pressure upon annular groove of the belled pipe and the outside surface of the spigot pipe.

* * * * *